United States Patent
Wang

(10) Patent No.: US 8,284,550 B2
(45) Date of Patent: Oct. 9, 2012

(54) HOUSING AND METHOD FOR MAKING THE SAME

(75) Inventor: Qiang Wang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 404 days.

(21) Appl. No.: 12/693,628

(22) Filed: Jan. 26, 2010

(65) Prior Publication Data

US 2011/0007459 A1    Jan. 13, 2011

(30) Foreign Application Priority Data

Jul. 10, 2009   (CN) .......................... 2009 1 0304195

(51) Int. Cl.
*G06F 1/16* (2006.01)

(52) U.S. Cl. .......... 361/679.3; 361/679.55; 361/679.56; 455/556.1; 455/556.2; 379/433.04

(58) Field of Classification Search ................ 361/679.3
See application file for complete search history.

(56) References Cited

U.S. PATENT DOCUMENTS

| | | | |
|---|---|---|---|
| 5,819,163 A * | 10/1998 | Tsukamoto et al. | 455/575.1 |
| 5,867,772 A * | 2/1999 | Jonsson et al. | 455/575.1 |
| 6,181,548 B1 * | 1/2001 | Wheeler | 361/679.21 |
| 6,195,141 B1 * | 2/2001 | Kawano et al. | 349/58 |
| 6,375,026 B1 * | 4/2002 | Sheldrake et al. | 220/4.02 |
| 6,462,938 B1 * | 10/2002 | Horne et al. | 361/679.28 |
| 6,654,069 B2 * | 11/2003 | Aubert Capella | 348/840 |
| 6,788,894 B2 * | 9/2004 | Suzuki et al. | 396/287 |
| 7,136,681 B2 * | 11/2006 | Sadler et al. | 455/575.1 |
| 7,454,014 B2 * | 11/2008 | Nuovo | 379/434 |
| 7,889,507 B2 * | 2/2011 | Ogatsu et al. | 361/752 |
| 2009/0291709 A1 * | 11/2009 | Lee et al. | 455/556.2 |

* cited by examiner

*Primary Examiner* — Anthony Q Edwards
(74) *Attorney, Agent, or Firm* — Altis Law Group, Inc.

(57) ABSTRACT

A housing includes a first housing, two nuts, an insert, a second housing and two bolts. The nuts are fixed to the insert, and the insert is integrally formed with the first housing. The second housing includes two posts. The two bolts are received in the posts, and are fixed to the nuts.

3 Claims, 2 Drawing Sheets

HOUSING AND METHOD FOR MAKING THE SAME

BACKGROUND

1. Technical Field

The present disclosure relates to a housing and a method for making the housing.

2. Description of related art

Currently, portable electronic devices such as mobile phones, laptops and personal digital assistants (PDAs) in widespread use incorporate at least two housings.

Typical housings of a portable electronic device include an upper housing and a lower housing. The upper housing may be fixed to the lower housing by bolts. However, such mechanism connection are not suitable for thinner portable electronic devices.

Therefore, there is room for improvement within the art.

BRIEF DESCRIPTION OF THE DRAWINGS

Many aspects of the housing and the method for making the housing can be better understood with reference to the following drawings. The components in the drawings are not necessarily drawn to scale, the emphasis instead being placed upon clearly illustrating the principles of the housing and the method for making the housing. Moreover, in the drawings like reference numerals designate corresponding parts throughout the several views.

DETAILED DESCRIPTION

Figure 1:
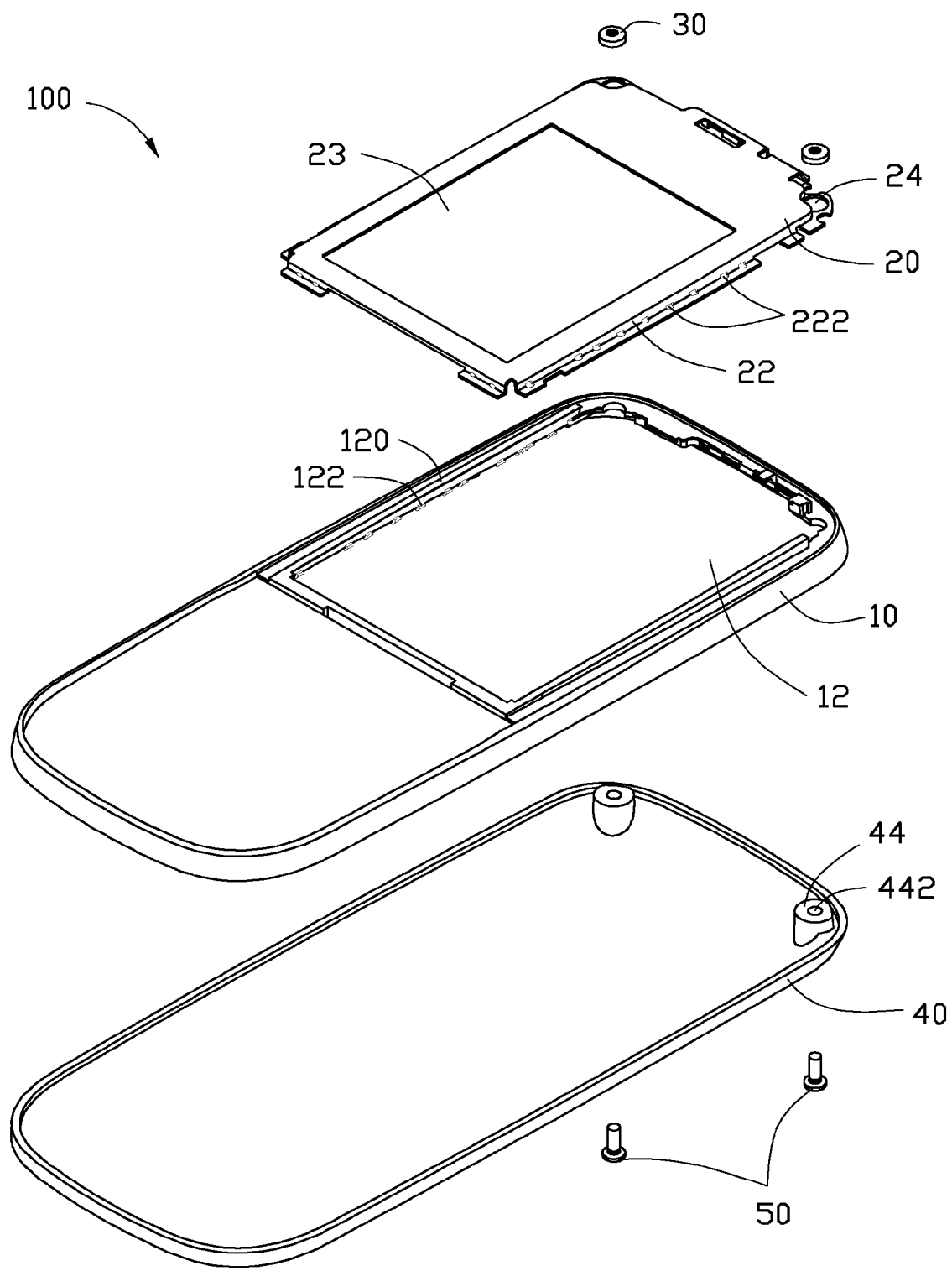
FIG. 1 shows an exploded, schematic view of an exemplary embodiment of the present housing.
Figure 2:
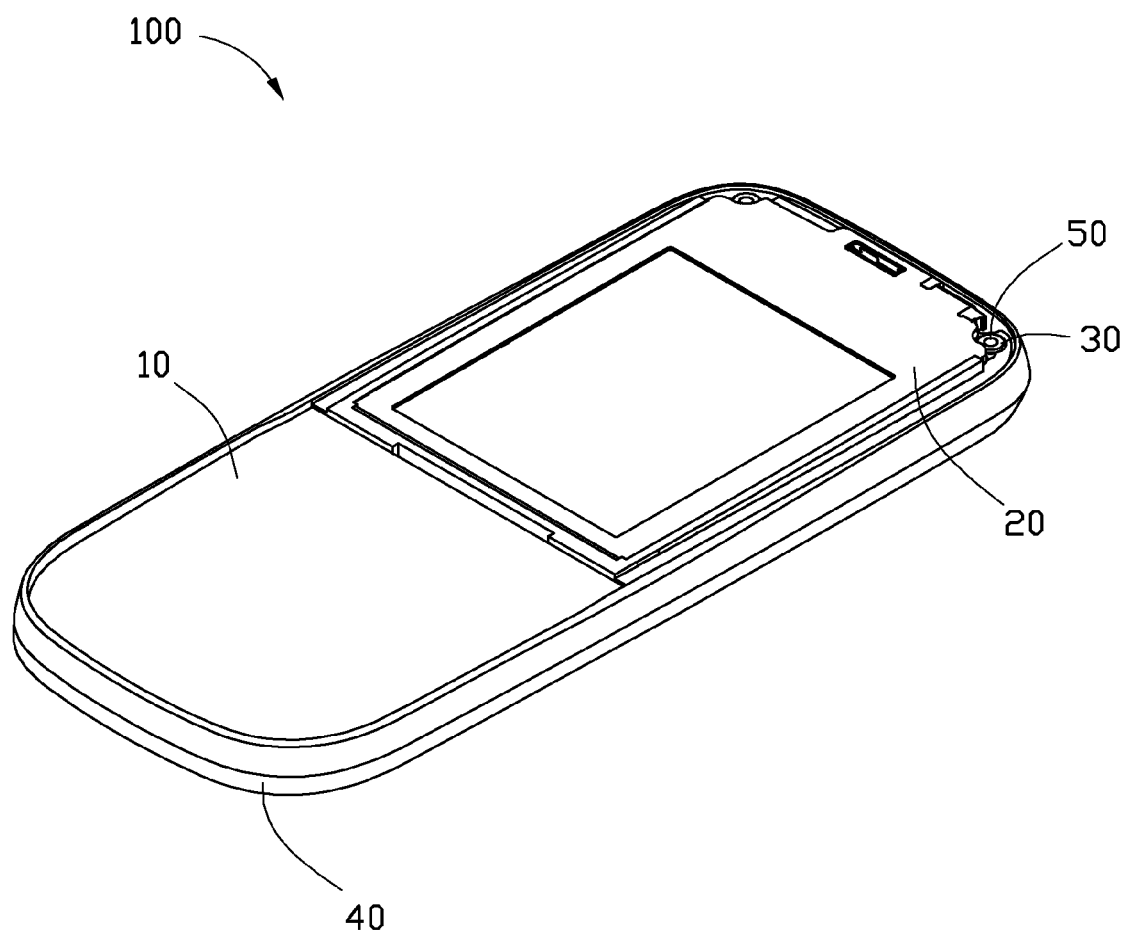
FIG. 2 shows an assembled schematic view of the housing.

Referring to FIGS. 1 and 2, an exemplary embodiment of a housing 100 is shown. The housing 100 includes a first housing 10, an insert 20, two nuts 30, a second housing 40 and two bolts 50.

The first housing 10 can be formed by injection molding a moldable material. The moldable material can be made of a resin material selected from a group consisting of polypropylene (PP), polyamide (PA), polycarbonate (PC), polyethylene terephthalate (PET), and polymethylmethacrylate (PMMA), etc. The first housing 10 defines a rectangular opening 12 and four edge portions 120. At least one edge portion 120 forms a plurality of projections 122. The projections 122 are positioned at an intersection of two surfaces of the at least one edge portion 120. The size and arrangement of the opening 12 and the projections 122 may be varied according to the insert 20.

The insert 20 is made of metal such as iron, stainless steel or aluminum. In this exemplary embodiment, the insert 20 is made of iron. The insert 20 may be molded into the first housing 10. The insert 20 includes at least one bent edge 22 with a plurality of latching holes 222 corresponding to the projections 122 of the first housing 10. Each latching hole 222 is defined at a fold line of the at least one bent edge 22. The bent edges 22 are engagable into the opening 12, and the projections 122 are engagable in the latching holes 222. Thus, the insert 20 can be secured to the first housing 10, thereby increasing the structural strength of the housing 100. The insert 20 defines an opening 23 for receiving a display screen and two nut holes 24 at corners of one end thereof. The two nuts 30 are respectively received into the two nut holes 24, and are welded to the insert member 20. When the insert 20 is molded into the first housing 10, the nuts 30 are molded into the first housing 10.

The size and shape of the second housing 40 correspond to the size and shape of the first housing 10. The second housing 40 can be formed by injection molding a resin material. The resin material can be selected from a group consisting of polypropylene (PP), polyamide (PA), polycarbonate (PC), polyethylene terephthalate (PET), and polymethylmethacrylate (PMMA), etc. The second housing 40 forms two posts 44 at one end thereof corresponding to two nut holes 24 of the first housing 10. Each post 44 defines a through hole 442. The bolts 50 may extend into the through holes 442 of the posts 44 of the second housing 40, and are fixed to the nuts 30 of the first housing 10. Thus, the first housing 10 is secured to the second housing 40, thereby increasing the structural strength of the housing 100.

An exemplary embodiment of a method for making the housing 100 may include the following steps:

An insert 20 is provided. The insert 20 includes at least one bent edge 22 with a plurality of latching holes 222. Each latching hole 222 is defined at a fold line of bent edges 22. The insert 20 defines two nut holes 24 at corners of one end thereof. The two nuts 30 are respectively received into the two nut holes 24, and are welded to the insert 20.

An injection molding machine is provided. The insert 20 is placed in the injection molding machine. Then, the resin material is injected into the mold to form the first housing 10. The first housing 10 is integrally formed with the insert 20, and the resin material is formed into the latching holes 222 to improve bonding strength and increase contact area between the first housing 10 and the insert 20. Thus, the insert 20 is secured to the first housing 10 and structural strength of the housing 100 is improved.

The second housing 40 forms two posts 44 at one end thereof corresponding to two latching holes 222 of the first housing 10. Each post 44 defines a through hole 442. The bolts 50 may be received in the through holes 442 of the posts 44 of the second housing 40, and are fixed to the nuts 30 of the first housing 10. Thus, the first housing 10 is secured to the second housing 40, thereby increasing structural strength of the housing 100.

It should be also understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A method of forming a housing using a molding apparatus having a mold cavity, comprising:

providing an insert and a nut, the insert made of metal and including two opposite bent edges and a nut hole, the nut being fixed to the nut hole of the insert, each bent edge defining a plurality of latching holes formed at a fold line thereof;

placing the insert with the nut into the molding apparatus;

injecting a molten material into the mold cavity and surrounding the insert to form a first housing moldingly bonded to the insert, the molten material formed into the latching holes;

providing a second housing including a post;

extending a bolt through the post of the second housing and fixing the bolt with the nut of the first housing.

2. A housing, comprising:

two nuts;

an insert made of metal and including two opposite bent edges, the insert defining two nut holes at corners of one end thereof, the nuts being fixed to the nut holes of the insert, each bent edge defining a plurality of latching holes formed at a fold line thereof, molten material filled around the insert and flowing into the latching holes to form a first housing integrally formed with the insert, the molten material in the latching holes of the insert forming a plurality of projections;

a second housing including two posts corresponding to the two nuts; and two bolts, each bolt being received in one of the posts, and being fixed to one of the nuts for connecting the first housing and the second housing.

3. The housing as claimed in claim 2, wherein the first housing defines a rectangular opening and four edge portions, two of edges portions form the projections, each projection is positioned at an intersection of two surfaces of the first housing, the insert is received in the opening, the projections are directly formed in the latching holes.

\* \* \* \* \*